Figure 1:
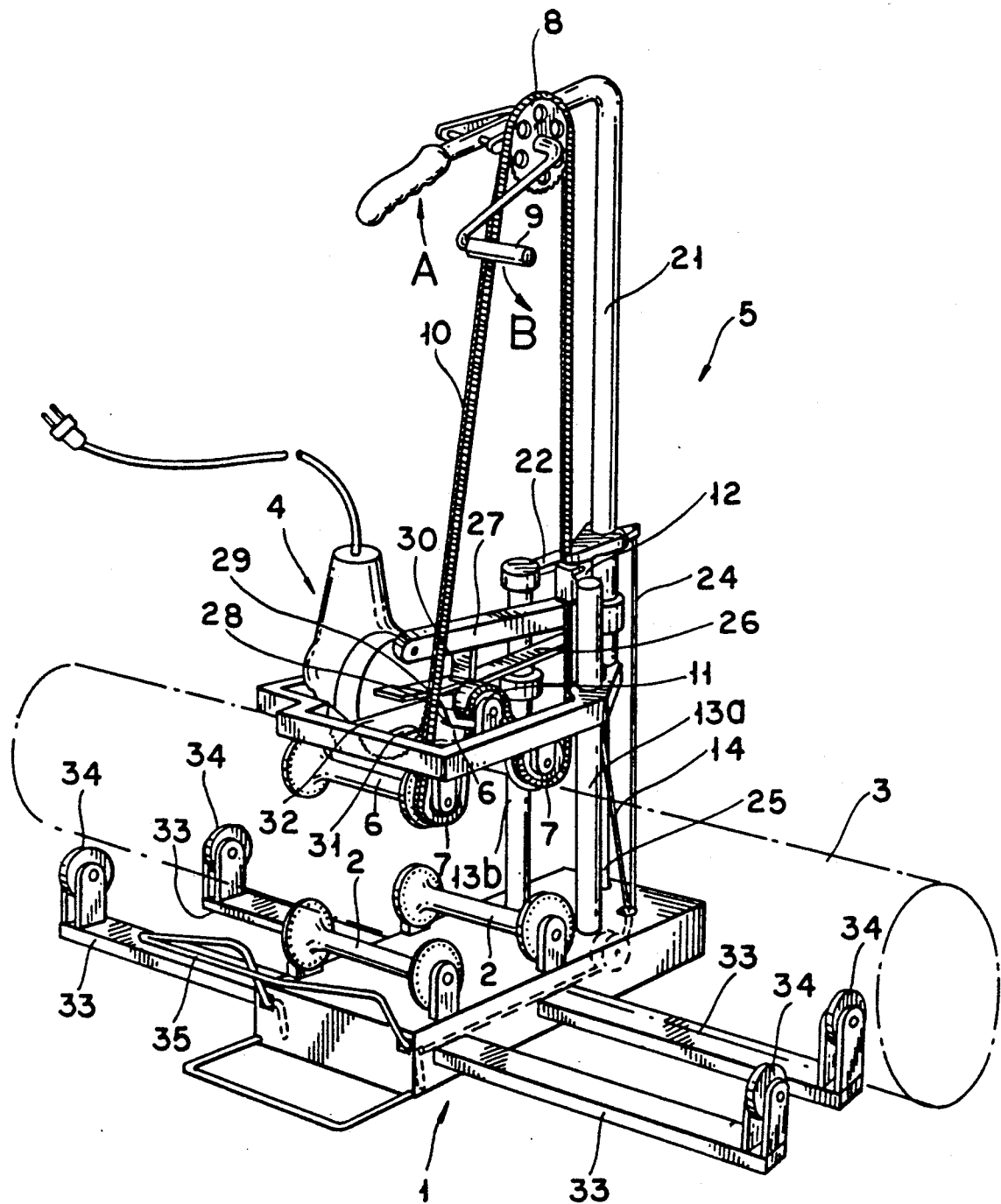

United States Patent [19]

Hyvärinen

[11] Patent Number: 5,027,681
[45] Date of Patent: Jul. 2, 1991

[54] CUTTING AND MACHINING DEVICE FOR CYLINDRICAL BODIES, ESPECIALLY TUBES

[76] Inventor: Mauno Hyvärinen, Ketjutie 94, SF-00560 Oulu, Finland

[21] Appl. No.: 435,454
[22] PCT Filed: Feb. 29, 1988
[86] PCT No.: PCT/FI88/00031
§ 371 Date: Nov. 15, 1989
§ 102(e) Date: Nov. 15, 1989
[87] PCT Pub. No.: WO88/06934
PCT Pub. Date: Sep. 22, 1988

[30] Foreign Application Priority Data

Mar. 18, 1987 [FI] Finland ................. 871173

[51] Int. Cl.⁵ .............................. B23D 21/04
[52] U.S. Cl. ............................ 82/101; 82/83; 30/94; 409/166; 409/199
[58] Field of Search ............ 30/94, 102; 409/165, 409/166, 199; 82/101, 83

[56] References Cited

U.S. PATENT DOCUMENTS

| | | | |
|---|---|---|---|
| 1,415,530 | 5/1922 | Davis | 409/165 |
| 1,992,812 | 2/1935 | Chapman | |
| 3,292,468 | 12/1966 | Orthey | |
| 3,302,285 | 2/1967 | Mann, Jr. | 30/102 |
| 3,520,218 | 7/1970 | Tolkmitt | 30/102 |
| 3,541,905 | 11/1970 | Mey | 82/101 |
| 3,572,199 | 3/1971 | Harden | 82/101 |
| 4,412,401 | 11/1983 | Fundell | 51/103 R |
| 4,693,149 | 9/1987 | Sireix | 82/101 |

FOREIGN PATENT DOCUMENTS

| | | |
|---|---|---|
| 168334 | 1/1986 | European Pat. Off. |
| 1627160 | 9/1970 | Fed. Rep. of Germany |
| 555719 | 11/1979 | Switzerland |
| 1207657 | 6/1983 | U.S.S.R. |
| 81/00821 | 4/1981 | World Int. Prop. O. |

Primary Examiner—Douglas D. Watts
Assistant Examiner—John M. Husar
Attorney, Agent, or Firm—Ladas & Parry

[57] ABSTRACT

The device comprises a lower frame (1) with lower supporting rolls (2) to support a cylindrical body (3) to be placed thereon, rotating elements (6–11) to rotate the cylindrical body, and a cutting/machining means (4) for cutting and/or machining the cylindrical body. To provide a simple portable cutting and machining device, it further comprises an upper frame (5) arranged in the lower frame (1) and movable by means of transfer elements (6–12, 25) in the vertical direction with respect to the lower frame and to be locked in its place, to the lower part of which upper frame are fastened upper supporting rolls (6) corresponding to the lower supporting rolls, whereby the rotatable body (3) to be supported is intended to be placed between the lower and upper supporting rolls (2, 6), while the rotating elements to rotate the cylindrical body are formed of the upper supporting rolls, transmission gears (7) fastened to the upper supporting rolls, a transmission wheel (8) arranged in the upper part of the upper frame and an operating handle (9) fastened hereto as well as of a flexible transmission element (10) circulating around the gears (7) and the wheel (8).

6 Claims, 3 Drawing Sheets

CUTTING AND MACHINING DEVICE FOR CYLINDRICAL BODIES, ESPECIALLY TUBES

The invention relates to a cutting and machining device for cylindrical bodies, especially tubes.

Prior art cutting and machining devices are described, e.g. in the Swedish Patent 214 701, in the Swedish Published Specification 421 881, in the German Auslegeschrift 1 627 160 and in the U.S. Pat. No. 3,302,285. The devices according to the Swedish publications mentioned are big and heavy and they are not intended to be moved or carried by hand. The device according to the German Auslegeschrift 1 627 160 again is not actually intended to be used for cutting tubes, but especially for cutting metallic cylinder linings and piston rings of combustion engines. The device according to the U.S. Pat. No. 3,302,285 is portable and small and it is primarily intended for cutting copper tubes with small diameters. This device does not show proper tube rotating elements, which makes the cutting difficult and slow. Additionally, the tube to be cut is insufficiently supported, which makes it necessary to press the upper part of the device all the time against the tube by hand.

The object of the present invention is to provide a new portable device especially intended for cutting and machining tubes, which avoids the problems described above. The device is easy to use. Its cutting or machining takes place quickly and accurately. This object is achieved in that the rotating elements that rotate the cylindrical body are the upper supporting rolls, transmission gears are fastened to the upper supporting rolls, a transmission wheel is arranged in the upper part of the upper frame with an operating handle, and as a flexible transmission element circulates around the gears and the wheel.

In this way, a reliable and cheap manually operated tube rotating mechanism is provided for cutting or machining a tube, whereby the tube is safely supported as well. The weight of the device can be made small and when the operating handle of the rotating mechanism with its transmission gears is arranged high enough in the upper frame, it is not necessary to work in a bent position. The device is especially suitable for cutting plastic tubes. Earlier, e.g. plastic drain pipes were cut with a hack saw or the like, since no suitable tool existed, which resulted in oblique and easily cleaving tube ends causing sealing problems. Electric tools for domestic use, e.g. an angle grinding machine, can be used as cutting and machining means.

The transmission gears and an intermediate gear are preferably toothed or chain gears, the transmission wheel is a toothed or chain wheel and the flexible transmission element is a cogged belt or chain.

It is especially preferable that the transfer elements to move the upper frame downwards are formed of the rotating elements and of a locking element arranged in the lower frame, which locking element locks the flexible transmission element to the lower frame, when the handle is rotated in the direction intended for moving the upper frame downwards, which direction is opposite to the direction in which the cylindrical body is intended to be rotated, thus causing the upper frame to move downwards, which locking element can be released by means of a release element. In this structure, the tube rotating mechanism is also used for lowering the upper frame and at the same time for pressing the driving upper supporting rolls with a suitable tightness on the tube. This simplifies the structure considerably and also enables a quick and easy lowering of the upper frame. A rotation of the tube can be started only by changing the rotating direction of the operating handle without loosening the grip on the operating handle.

Moreover, it is preferable that inside the vertical part of the upper frame is arranged a gas piston leaning on the lower frame in order to lift the upper frame upwards when the upper frame is released from locking.

Figure 2:
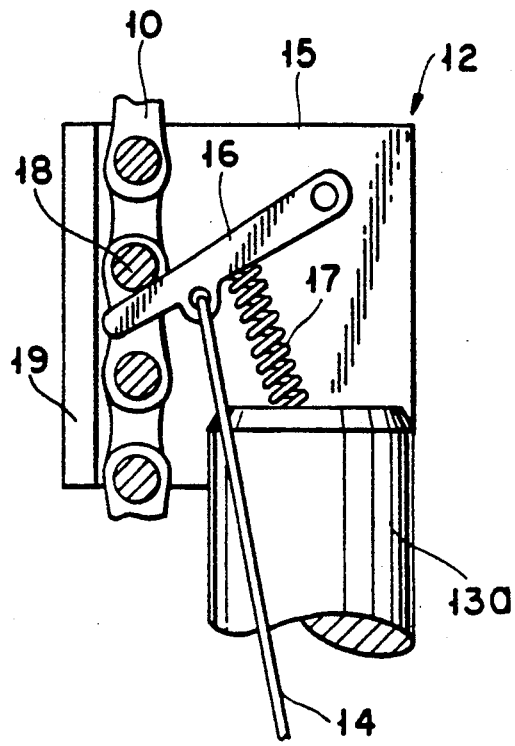
Figure 3:
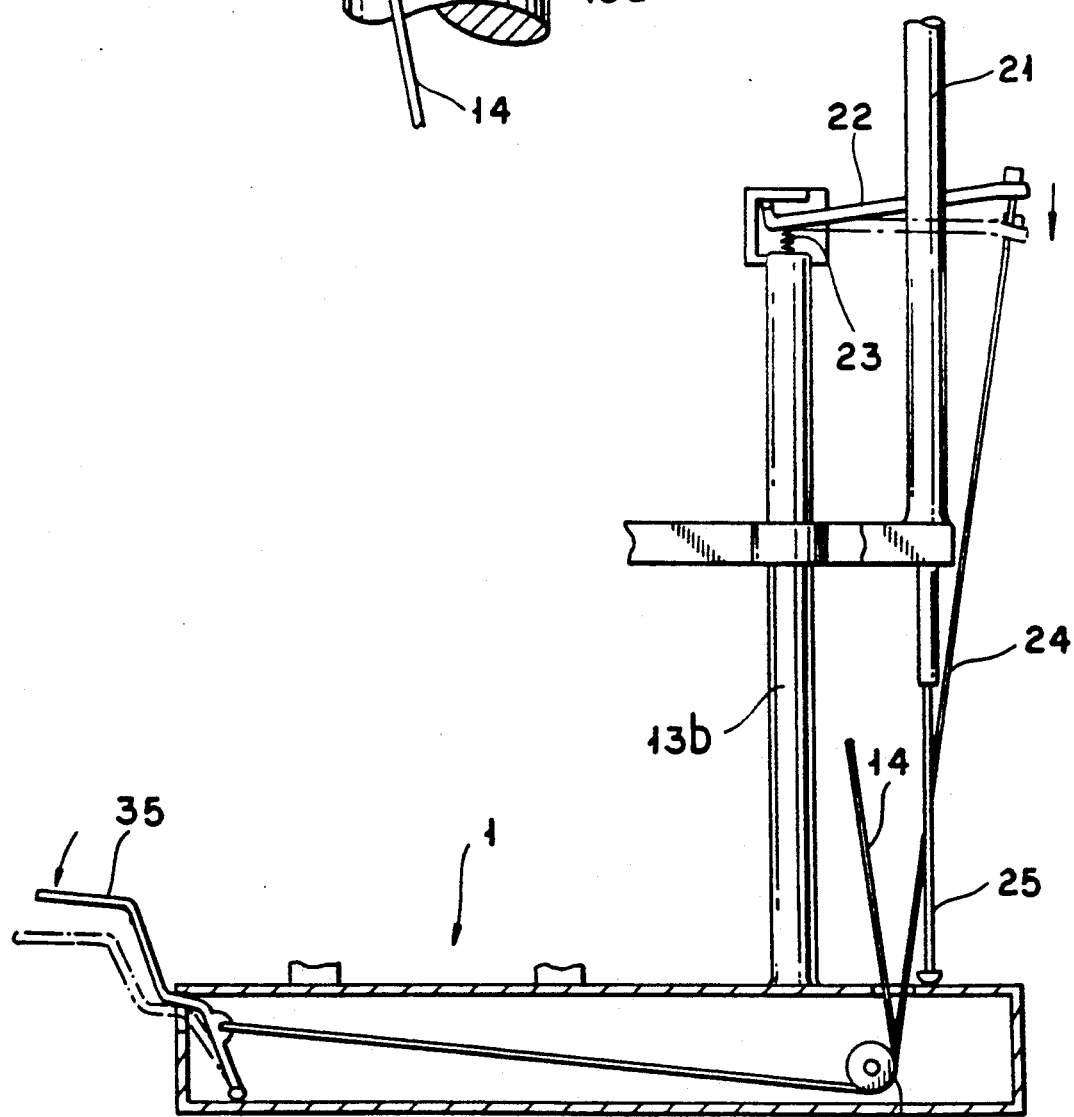
Figure 4:
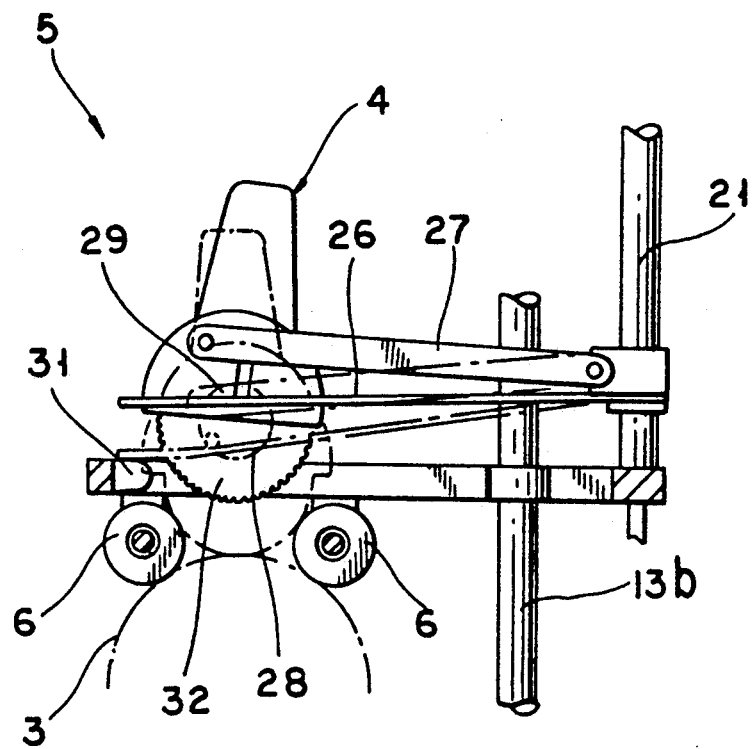

In the following, the invention is explained in more detail by means of a preferable embodiment with reference to the enclosed drawings, in which FIG. 1 shows a perspective view of a device of the invention, FIG. 2 shows the locking device of the transfer elements of the device of FIG. 1 on a larger scale, FIG. 3 shows the locking between the upper and lower frame of the device of FIG. 1 enlarged, and FIG. 4 shows the suspension of the cutting/machining element of the device of FIG. 1.

The cutting and machining device shown in the drawing comprises a lower frame 1, on the upper surface of which there are preferably lower supporting rolls 2 formed of two bicycle wheel hubs and located in the longitudinal direction of the lower frame successively at a distance from each other and intended to support a tube 3 to be placed thereon. Additionally, the lower frame 1 comprises extra supporting rolls 34 fastened to the ends of extensions 33 extending horizontally outwards from the lower frame, which extra supporting rolls are intended to give extra support to the tube 3. From the rear part of the lower frame 1, two slide rods 13a and 13b are extending vertically upwards, in which rods is arranged an upper frame 5 to slide in the vertical direction.

To the lower part of the upper frame 5 are fastened upper supporting rolls 6 corresponding to the lower supporting rolls 2 and also formed of wheel hubs, whereby the tube 3 is intended to be placed between the upper and lower supporting rolls 2 and 6. The rotating elements of the body 3 between the supporting rolls 2 and 6 are formed of toothed gears 7 fastened to the ends of the upper supporting rolls 6, of a chain wheel 8 suspended from the upper part of the upper frame 5 by means of a vertical tube 21 and of an operating handle 9 fastened to the chain wheel as well as of a chain 10 circulating around the gears 7 and the wheel 8. The gears 7 and 8 as well as the chain 10 can be similar parts as used in a bicycle. The chain 10 is additionally led to run via an intermediate gear 11 situated higher than the upper supporting rolls 6 and also fastened to the upper frame 5 in order not to touch the tube 3 when the tube diameter is small.

In the structure described, the rotating elements 6-11 mainly form also the elements necessary for moving the upper frame 5 downwards. In addition to this, only a locking element 12 is required to lock the chain 10 in its place in the lower frame 1 when rotating the handle 9 in the opposite direction with respect to the rotating direction of the tube 3, thus making the upper frame 5 to move downwards. The locking element 12 is formed of a chain guide 15 placed at the end of the slide rod 13a of the lower frame 1 and of a locking pin 16 fastened to the guide, which locking pin by means of a spring 17 is pressed between the pins 18 of the chain 10 and locks the chain against the bent edge 19 of the chain guide 15 (FIG. 2).

A release means 35, 14 of the locking element 12 is arranged to release the chain 10 in connection with lifting up the upper frame 5, which release means comprises a wire 14 connected with the locking pin 16 and a foot lever 35 in the front part of the lower frame, to which foot lever is led one end of the wire via a guiding pulley 20 inside the lower frame (FIGS. 1 and 2).

A locking plate 22 is arranged to lock the upper frame 5 in its place, whereby through a hole at one end of this plate is led the vertical tube 21 of the upper frame and the other end of the plate is arranged at the end of the other slide rod 13b of the lower frame 1 by means of a spring 23 bending the locking plate upwards, whereby the upper frame 5 can be locked in its place between the hole of the locking plate 22 and the vertical tube 21 by means of a press-on fit effected by the spring 23 in a similar way as e.g. in height adjustment mechanisms of office chairs. The locking plate 22 and, consequently, the whole upper frame 5 can be released from locking by means of a wire 24 fastened to the free end of the locking plate and by means of the foot lever 35 to be used for the release of the chain 10. The wire 24 is arranged so that it releases the upper frame 5 from locking only after the release of the chain 10 in order to keep the handle 9 in its place when lifting the upper frame 5 (FIGS. 1 and 3).

Inside the vertical tube 21 of the upper frame 5, there is preferably arranged a gas piston 25 leaning on the lower frame 1 in order to lift the upper frame upwards when the upper frame is released from locking.

The cutting/machining means 4 is supported against the upper frame 5 by means of a supporting part 27 so as to be turnable in a vertical plane and it is forced from below upwards by a leaf spring 26 fastened to the upper frame. In the intermediate gear 11, there is arranged a friction brake 28 provided with a pin 29 extending on the leaf spring, whereby when using the rotating elements 6-11 in the lowering direction of the upper frame, the pin 29 is placed against a stop 30 of the supporting part 27, while in the rotating direction of the tube 3, the pin presses the leaf spring down against another stop 31 in the upper frame so that a knife 32 of the machining-/cutting means 4 is placed on the surface of the tube 3 for cutting or machining (FIGS. 1 and 4).

The cutting and machining device described above is used in the following way:

A body 3 to be cut or machined is led on the lower supporting rolls 2 and the extra supporting rolls 34, whereby the suitably designed foot lever 35 can be used as help. After this, an clockwise rotation of the operating handle 9 is started in the direction of the arrow A, whereby the chain 10 is automatically locked to the lower frame 1 at the locking element 12, which leads to that the upper frame begins to sink when the handle 9 is still rotated in the same direction. The upper frame 5 is lowered until it lies suitably tight on the body 3. When the rotation of the handle 9 ceases, the locking plate 22 locks the upper frame 5 in its place in the lower frame 1 by means of the spring 23 pushing upwards the locking plate and also by means of the gas piston 25 pushing upwards the upper frame 5. Thereafter, the rotary direction of the handle 9 is changed so as to occur counterclockwise in the direction of the arrow B (the locking element 12 of the chain 10 does not prevent a movement in this direction), whereby the body 3 begins to rotate while the pin 29 of the friction brake 28 in the intermediate gear 11 presses downward the leaf spring 26 forcing upwards the cutting/machining means 4 so that the knife 32 of the means 4 can sink on the surface of the body 3 to start cutting or machining. It is possible to cause an automatic starting of the cutting/machining means 4 when the handle 9 is rotated in the direction B. The body 3 is rotated until the cutting or machining is accomplished. Finally, the upper frame 5 is released from locking by means of the foot lever 35, which results in that the upper frame rises up by means of the gas piston 25. The bodies 3 now cut or machined can be removed and the measures described above can be repeated.

The drawings and the description related thereto are only intended to visualize the idea of the invention. As to the details, the device according to the invention can vary within the scope defined in the claims enclosed.

I claim:

1. In a cutting and machining device for a cylindrical body, especially a tube, the device having
    a lower frame (1) having on its upper surface lower supporting rolls (2) for supporting rotatably a cylindrical body (3) when placed thereon,
    an upper frame (5) vertically extending from the upper surface of the lower frame (1), vertically movable and lockable with respect thereto by transfer elements (6-12, 25), and having upper supporting rolls (6) for further supporting rotatably the cylindrical body (3) when placed on the lower supporting rolls (2, and the upper supporting rolls are lowered thereto,
    rotating elements (6-11) for rotating the cylindrical body (3) when further supported, the rotating elements having a flexible transmission element (10), and
    a cutting/machining means (4) for at least one of cutting and machining the cylindrical body (3) when further supported, the improvement comprising that:
    the rotating elements comprise the upper supporting rolls (6), transmission gears (7) fastened to upper supporting rolls, a transmission wheel (8) in an upper part of the upper frame and having a handle (9) for rotationally operating the transmission wheel, and the flexible transmission element (10), the flexible transmission element (10) circulating around the transmission gears (7) and wheel (8);
    the flexible transmission element (10) is led to run between the upper supporting rolls (6) via an intermediate gear (11) situated on the upper frame higher than the upper supporting rolls;
    the transfer elements comprise the rotating elements (6-11) and a locking element (12) in the lower frame (1), the locking element locking the flexible transmission element (10) to the lower frame (1) when the handle (9) is rotated in a first direction for moving the upper frame downwards, the first direction being opposite to a direction for the rotation of the cylindrical body (3) for causing the upper frame to move downwards, the locking element (12) being releasable with a release element (35, 14).

2. The device according to claim 1, wherein the flexible transmission element is a cogged belt or chain (10) and the locking element (12) is a guide (15) for the cogged belt or chain (10), the guide being at an end of a slide rod (13a) fastened to the lower frame (1) for slidingly receiving the upper frame (5), and a locking pin (16) fastened to the guide, a spring (17) sinking the locking pin (16) between cogs of the cogged belt or pins

(18) of the chain for locking the cogged belt or chain against a bent edge (19) of the guide (15).

3. The device according to claim 2, wherein the release element (35, 14) is a wire (14) connected with the locking pin (16) and a foot lever (35) on a front part of the lower frame (1), the wire being led to the foot lever via a guiding pulley (20) inside the lower frame.

4. The device according to claim 1, wherein the transfer elements for locking the upper frame comprise a locking plate (22) for locking the upper frame (5) vertically in a place, a vertical part (21) of the upper frame passing through a hole in one end of the locking plate and an opposite end of the locking plate being at an end of another slide rod (13b) of the lower frame (1) having a spring (23) for bending the locking plate upwards, whereby it is possible to lock the upper frame (5) in its place between the hole of the locking plate (22) and the vertical part (21) of the upper frame with a press-on fit effected by the spring (23), the locking plate (22) being releasable from the vertical part (21) with a wire (24) fastened to the one end of the locking plate and a foot lever (35).

5. The device according to claim 1, wherein a vertical part (21) of the upper frame (5) has a gas piston (25) leaning on the lower frame (1) to lift the upper frame (5) upwards when the upper frame is released from locking.

6. The device according to claim 1, wherein the cutting/machining means comprises a leaf spring fastened to the upper frame (5) for forcing the cutting/machining means (4) upwards from below upwards, the cutting/machining means being supported on the upper frame by a supporting part (27) for turning in a vertical plane the intermediate gear (11) having a friction brake (28) provided with a pin (29) extending to the leaf spring, whereby when using the rotating elements (6-11) in the lowering direction of the upper frame, the pin (29) is located against a stop (30) of the supporting part (27), while when using the rotating elements in the direction intended for the rotation of the cylindrical body (3), the pin (29) presses the leaf spring down against another stop (31) in the upper frame so that a knife (32) of the cutting/machining means (4) is located on the surface of the cylindrical body (3) for the one of cutting and machining.

* * * * *